(12) United States Patent
Sharma et al.

(10) Patent No.: US 11,737,005 B2
(45) Date of Patent: *Aug. 22, 2023

(54) EQUIPMENT AND MOBILE TELECOMMUNICATIONS SYSTEM

(71) Applicant: Sony Group Corporation, Tokyo (JP)

(72) Inventors: Vivek Sharma, Basingstoke (GB); Yuxin Wei, Basingstoke (GB); Hideji Wakabayashi, Basingstoke (GB); Shinichiro Tsuda, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/729,033

(22) Filed: Apr. 26, 2022

(65) Prior Publication Data

US 2022/0264416 A1 Aug. 18, 2022

Related U.S. Application Data

(63) Continuation of application No. 16/960,577, filed as application No. PCT/EP2019/050466 on Jan. 9, 2019, now Pat. No. 11,337,129.

(30) Foreign Application Priority Data

Jan. 9, 2018 (EP) .................................... 18150799

(51) Int. Cl.
*H04W 24/10* (2009.01)
*H04W 36/32* (2009.01)
*H04B 7/185* (2006.01)
*H04W 84/00* (2009.01)

(52) U.S. Cl.
CPC ........ *H04W 36/32* (2013.01); *H04B 7/18504* (2013.01); *H04W 24/10* (2013.01); *H04W 84/005* (2013.01)

(58) Field of Classification Search
CPC ... H04W 36/32; H04W 24/10; H04W 84/005; H04W 84/00; H04B 7/18504
See application file for complete search history.

(56) References Cited

U.S. PATENT DOCUMENTS 9,467,922 B1 10/2016 Buchmueller et al.
2020/0359234 A1* 11/2020 Määttanen ......... H04B 7/18506

OTHER PUBLICATIONS

Qualcomm Incorporated: "Identification and certification of Aerial Vehicles",3GPP DRAFT; R2-1708238 Drone Identification and Certification, 3GPP, vol. RAN WG2, No. Berlin, Germany; Aug. 21, 2017-Aug. 25, 2017 Aug. 20, 2017 (Aug. 20, 2017), XP051318140, Retrieved from the Internet: URL:http://www.3gpp.org/ftp/Meetings_3GPP_SYNC/RAN2/Docs/ [retrieved on Aug. 20, 2017].
International Search Report and Written Opinion dated Feb. 19, 2019 for PCT/EP2019/050466 filed on Jan. 9, 2019, 15 pages.

(Continued)

*Primary Examiner* — Chuong A Ngo
(74) *Attorney, Agent, or Firm* — Xsensus LLP

(57) ABSTRACT

A base station configured to communicate with at least one user equipment for an unmanned aerial vehicle, the base station comprising circuitry configured to detect a change from an airborne mode to a terrestrial mode based on an indication received from the at least one user equipment.

19 Claims, 3 Drawing Sheets

(56) References Cited

OTHER PUBLICATIONS

Ericsson, "Summary on [99b#61][LTE/UAV] Identify potential solutions on mobility enhancement," 3GPP TSG-RAN WG2 No. 100, R2-1713451, Reno, Nevada, USA, Nov. 27-Dec. 1, 2017, 23 pages.
Fraunhofer HHI and Fraunhofer IIS, "Handover enhancements for UAVs," 3GPP TSG-WG2 Meeting No. 100, R2-1712469, Reno, USA, Nov. 27-Dec. 1, 2017, pp. 1-5.
Kddi, "Proposal of potential LTE enhancements for Aerial Vehicles," 3GPP TSG-RAN2 Meeting No. 98, R2-1705999, Hangzhou, China, May 15-19, 2017, pp. 1-5.
Lenovo and Motorola Mobility, "Discussion for status management for aerial UE," 3GPP TSG-RAN WG2 Meeting No. 100, R2-1713314, Reno, USA, Nov. 27-Dec. 1, 2017, 2017, pp. 1-3.
Lenovo and Motorola Mobility, "Consideration for potential mobility enhancement for aerial UE," 3GPP TSG-RANWG2 Meeting No. 99bis, R2-1711377, Prague, R2-1711377 Czech, Oct. 9-13, 2017, pp. 1-6.
NTT Docomo, Inc. and Ericsson, "Presentation of Specification/Report to TSG:TR36.777, Version 1.0.0 on Study on Enhanced LTE Support for Aerial Vehicles," 3GPP TSG-RAN Meeting No. 78, TDOC RP-172279, Lisbon, Portugal, Dec. 18-21, 2017, 1 page.
NTT Docomo, Inc., Ericsson, "Motivation for WD on Enhanced LTE Support for Aerial Vehicles," RAN #78, Lisbon, Portugal, Dec. 18-22, 2017, AI 10.1.2, RP-172670, 9pp.
Sequans Communications, 3GPP TSG-RAN WG1 #90-Bis R1-1718298, Prague, CZ, Oct. 9-13, 2017, "Interference Detection of Aerial Vehicles", 3pp.
NTT Docomo, Inc. (Rapporteur), "Summary of email discussion [99#37][LTE/UAV] DL and UL Interference detection", 3GPP TSG-RAN WG2 #99bis R2-1711738, Prague, Czech Republic, Oct. 9-13, 2017, 34pp.

\* cited by examiner

EQUIPMENT AND MOBILE TELECOMMUNICATIONS SYSTEM

CROSS-REFERENCE TO RELATED APPLICATIONS

The present application is a continuation of U.S. application Ser. No. 16/960,577, filed Jul. 8, 2020, which is based on PCT filing PCT/EP2019/050466, filed Jan. 9, 2019, which claims priority to EP 18150799.7, filed Jan. 9, 2018, the entire contents of each are incorporated herein by reference.

TECHNICAL FIELD

The present disclosure generally pertains to a user equipment and a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system may be based on LTE or LTE-A, respectively, it is assumed that specific requirements of the 5G technologies will, basically, be dealt with by features and methods which are already defined in the LTE and LTE-A standard documentation.

5G technologies will allow a concept of a so called "virtual cell" or "local cell" or the like. In this concept a cell is served, for example, by a user equipment ("UE"), e.g. a mobile phone, a computer, tablet, tablet personal computer or the like including a mobile communication interface, or any other device which is able to perform a mobile telecommunication via, for example, LTE(-A) or NR, such as a hot spot device with a mobile communication interface.

Furthermore it is known that a cell (e.g. a normal cell, a virtual cell, etc.) is configured to provide one or more predefined services, such as D2D (device-to-device), MBMS (multimedia broadcast multicast service), eMBB (enhanced mobile broadband), URLLC (ultra-reliable low-latency communication), etc.

Additionally, Unmanned Aerial Vehicles (UAV), more commonly referred to as "Drones", are known, which may be aircrafts that operate with various degrees of autonomy. They may be, e.g., under remote control of a human operator or they may be autonomously controlled by an onboard micro controller. The remote control of drones may be based on a usage of cellular networks in a regulatory manner, and, thus, a support of cellular communication could be foreseen for drones. It also known that a drone may carry a legal UE, which may be certified for aerial usage, or a drone may carry a UE that is only certified for terrestrial operation, e.g. a smart phone.

Moreover, it is known that a UAV UE can switch between an airborne mode and a terrestrial mode, while the UAV UE is typically in an RRC_Connected mode, when it is airborne and goes into an RRC-Idle mode, when it becomes a terrestrial UAV UE.

Although, it is generally known to switch operation of UAV UEs between an airborne and a terrestrial mode, it is desirable to improve the operation of UAV UEs in a mobile telecommunications system.

SUMMARY

According to a first aspect, the present disclosure provides a user equipment for an unmanned aerial vehicle for a mobile telecommunications system including circuitry configured to communicate with at least one base station, wherein the circuitry is further configured to transmit an indication of a change from an airborne mode to a terrestrial mode.

According to a second aspect, the present disclosure provides a mobile telecommunications system including at least one base station configured to communicate with at least one user equipment for an unmanned aerial vehicle, wherein the user equipment for an unmanned aerial vehicle includes a circuitry configured to transmit an indication of a change from an airborne mode to a terrestrial mode; and the base station includes a circuitry configured to detect a change from the airborne mode to the terrestrial mode, based on the indication received from the user equipment.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
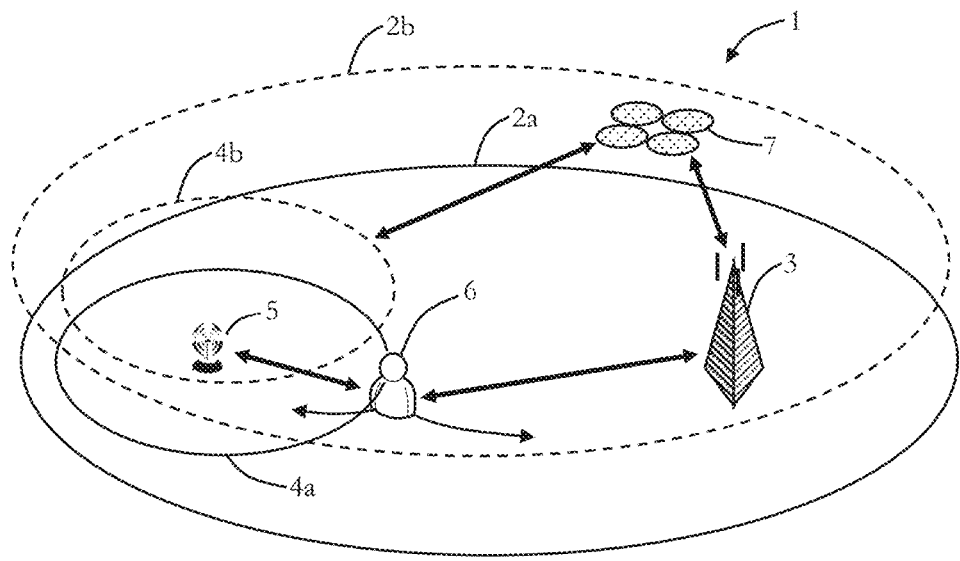
FIG. 1 illustrates an embodiment of a RAN.

Before a detailed description of the embodiments under reference of FIG. 1 is given, general explanations are made.

As mentioned in the outset, in general, several generations of mobile telecommunications systems are known, and currently the fifth generation ("5G") is under development which might be put into practice in the year 2020.

As discussed, one candidate for providing the requirements of 5G is the so-called Long Term Evolution ("LTE"), while other candidates for meeting the 5G requirements are termed New Radio (NR) Access Technology Systems (NR), wherein an NR can be based on LTE technology, just as LTE was based on previous generations of mobile communications technology.

For the future, 3GPP plans to further develop LTE-A such that it will be able to fulfill the technical requirements of 5G.

As the 5G system may be based on LTE or LTE-A, respectively, it is assumed that specific requirements of the 5G technologies will, basically, be dealt with by features and methods which are already defined in the LTE and LTE-A standard documentation, such that some of the embodiments may rely on that technology.

As also discussed above, 5G technologies will allow a concept of a so called "virtual cell" or "local cell" or the like, which may be implemented in some embodiments, as well as a logical separation between control plane and user plane, wherein a macro or anchor base station may provide a link of the control plane.

Furthermore it is known that a cell (e.g. a normal cell, a virtual cell, etc.) is configured to provide one or more predefined services, such as D2D (device-to-device), MBMS (multimedia broadcast multicast service), eMBB (enhanced mobile broadband), URLLC (ultra-reliable low-latency communication), etc., which is implemented in some embodiments.

As also mentioned in the outset, generally, Unmanned Aerial Vehicles (UAV), more commonly referred to as "Drones", are known to which also some embodiments pertain. As discussed, such UAVs may be aircrafts that operate with various degrees of autonomy, and they may be, e.g., under remote control of a human operator or they may be autonomously controlled by an onboard micro controller.

From 3GPP document 3GPP TR 36.777, V1.0.0 (2017-12), "3rd Generation Partnership Project; Technical Specification Group Radio Access Network; Study on Enhanced LTE Support for Aerial Vehicles (Release 15)" several study items are known.

For example, an airborne unmanned aerial vehicle user equipment (UAV UE) may experience downlink (DL) interferences, since it may see more cells compared to a terrestrial UE. Thus, UAV UE measurements in this case may be useful for the network. For uplink (UL) interference detection, it seems from TR 36.777 that new measurements may be introduced and UE location information may be used.

Another finding from this study item is that the UAV UE may use a directional antenna for avoiding DL interference. However, when the UAV UE becomes a terrestrial UE, e.g., since it lands, and is still in connected mode, then the directional antenna is not required and, thus, may probably create more interferences in a terrestrial network. Another finding is that the Network may deploy intra-site coherent JT (joint transmission) CoMP (coordinated multipoint) to mitigate DL interference for airborne UAV UE. CoMP may be deactivated once UE returns to the state of a terrestrial UE.

Rel-13 coverage extension technique are also found useful to solve synchronization and initial access. UL beamforming could also be used. However, as has been recognized, these techniques need to be deactivated once UAV UE becomes a terrestrial UE.

Furthermore, the mobility for UAVs may be enhanced. For instance, mobility enhancement of handover procedure and/or handover related parameters for Aerial UEs may be provided, based on information such as location information, UE's airborne status, flight path plan, etc. Also measurement reporting mechanism may be enhanced, e.g., by defining new events, enhancing triggering condition, and controlling the amount of measurement reporting, etc.

The above-mentioned study item also concluded that UAV UE could explicitly indicate that it is airborne. For instance, a UE, which is flying may be identified from the UE-based reporting, e.g., in-flight mode indication, altitude or location information, by utilizing enhanced measurement reporting mechanism (e.g. introduction of new events) or by the mobility history information available in the network. Based on the study, it is concluded that LTE networks are capable of serving Aerial UEs, but there may be challenges related to UL and DL interference as well as mobility.

In summary, it has been recognized that a UAV UE will be treated differently compared to a terrestrial UE in a network.

For instance, in an assumed trajectory of UAV it gets airborne when it starts and moves into an RRC_Connected state and stays continuously in RRC_Connected state while it is airborne. But, once it comes down to the ground, then it should move to RRC_IDLE mode and release the RRC connection.

However, it has been recognized that it may be useful that a UAV UE may still remain in RRC_Connected mode once it touches down the ground (and, thus, becomes a terrestrial UE). A use case, implemented in some embodiments, is that a UAV UE is uploading information to a back-end server while it is airborne (and in RRC_Connected mode) and then, e.g., waits for the analysis provided by the server and for a corresponding feedback, or it waits for retuning of parameters or it may simply wait for a next action, etc.

Consequently, some embodiments pertain to a mobile telecommunications system including at least one base station configured to communicate with at least one user equipment for an unmanned aerial vehicle, wherein the user equipment for an unmanned aerial vehicle includes a circuitry configured to transmit an indication of a change from an airborne mode to a terrestrial mode; and the base station includes a circuitry configured to detect a change from the airborne mode to the terrestrial mode, based on the indication received from the user equipment.

Generally, in some embodiments, the base station may be based on the principles of LTE (LTE-A) and/or it may be based on NR RAT, as also discussed above. The base station may be based on the known eNodeB of LTE, as one example, or it may be based on the discussed NR eNodeB (the next generation base station may also be referred to as gNB).

In some embodiments, the user equipment may be, for example, a mobile phone, smartphone, a computer, tablet, tablet personal computer, or the like, including a mobile communication interface, or any other device which is able to perform a mobile telecommunication via, for example, LTE or NR, such as a hot spot device with a mobile communication interface, etc.

In order to enhance the readability, the term unmanned aerial vehicle (UAV) user equipment (UE) will be used instead of the term user equipment for an unmanned aerial vehicle in the following description.

The UE may be mounted at or integrated in an Unmanned Aerial Vehicles (UAV) (a "Drone") which may be configured to operate with various degrees of autonomy, e.g. under remote control by a human operator or autonomously by an onboard micro controller. As already mentioned, the UAV may be any kind of vehicle which can lift up from the ground or can fly and the user equipment may be part of the UAV, may be a legal UE which is mounted to a drone or carried by a drone, etc. The UE may be certified for aerial use or it may be a terrestrial UE. In some embodiments, the UE is intended for being used airborne. The UE may such configured that it ca be separated from the UAV. The UAV UE may be configured to have at least two different operating states namely an airborne state, where it is in the air, and a terrestrial state where it is landed and, thus, on ground. Consequently, the UAV UE may be configured to have the airborne mode and the terrestrial mode, wherein the airborne mode is intended to be used during flight and the terrestrial mode being used at ground.

Generally, a circuitry may include at least one of: a processor, a microprocessor, a dedicated circuit, a memory, a storage, a radio interface, a wireless interface, a network interface, or the like, e.g. typical electronic components which are included in a base station, such as an eNodeB, NR eNodeB, or in a (UAV) user equipment.

Hence, in some embodiments, the UAV UE informs the network once it has become a terrestrial UE, wherein it may be still in RRC_Connected mode. This information exchange may happen when, e.g., the UAV UE moves from a (last) cell where it is airborne to a another cell where it is terrestrial, the exchange may happen once the UAV UE is connected via the cell where it is terrestrial, the network, e.g. the base station, may provide a different configuration for the (last) cell where the UAV UE is airborne than for the cell, where it is terrestrial, and/or the UAV UE applies different configurations in the (last) cell where it is airborne and the cell, where it is terrestrial.

In some embodiments, the indication transmitted from the user equipment is based on a measurement result report (e.g. provided by the UAV UE) and the base station is further configured to detect the change based on the measurement result report. Hence, for instance, the measurement report may be depend on whether the UAV UE is in the airborne mode or in the terrestrial mode. For instance, the UAV UE reports the measurement report (i.e. transmits the indication) in a format used by a terrestrial UE (in some embodiments a new parameter and/or new "performing measurements" methods are used for airborne UAV UE), such that the base station can detect the change from the airborne mode to the terrestrial mode based on the received measurement report.

In some embodiments, the flight path of the unmanned aerial vehicle user equipment is known and the base station at the end of the flight path is further configured to provide a measurement configuration for handover to another base station. During the flight path of the UAV UE, the UAV UE may pass several cells. For instance, in the beginning the UAV UE may be on ground (in the terrestrial mode) and may be in a cell which is served by a first base station. Then, the UAV UE starts and lifts up and changes from the terrestrial mode into the airborne mode and passes during flight several (aerial) cells while being in the air and while being in the airborne mode. Those cells may be served by other base stations. The (aerial) cells which are passed by the UAV UE during flight are within the flight path of the UAV UE and, thus, before landing of the UAV UE, the UAV UE may be in a (aerial) cell which is the last cell in which it is airborne. The base station of this last cell where the UAV UE is airborne provides the measurement configuration to another base station for which it is assumed that the UAV UE will be terrestrial again, and, thus, in the terrestrial mode.

In some embodiments, the base station is configured to inform another base station, during a handover procedure, about the mode (or status) of the UAV UE. Hence, the base station informs another base station, e.g., about the airborne mode or airborne status of the UAV UE.

In some embodiments, the base station at the end of the flight path is further configured to inform the other base station, during a handover procedure, that the unmanned aerial vehicle user equipment switches from the airborne mode to the terrestrial mode. Thereby, it is possible to provide a smooth handover of the UAV UE which switches from airborne to terrestrial mode and which may, for example, may continuous to be in RRC_Connected mode.

In some embodiments, the base station is further configured to set an inactivity timer for releasing an RRC connection of the unmanned aerial vehicle user equipment changing from airborne mode to terrestrial mode. The inactivity timer may have a larger value than a value of an inactivity timer set for a terrestrial user equipment. Thereby, it may be ensured that, for example, the UAV UE has enough to transmit data, such as measurement results or the like, to a server, when it has switched into terrestrial mode and before the RRC connection is released.

In some embodiments, the base station is further configured to configure a measurement configuration based on the indication. Hence, the base station may detect that the UAV UE has switched or will switch from airborne to terrestrial mode (or vice versa) and may provide a correspondingly configured measurement configuration to the UAV UE.

In some embodiments, the indication is an explicit indication. In such embodiments, the indication may include explicit information (e.g. a bit or several bits) in a transmitted message which status it has or will have, namely airborne or terrestrial.

In some embodiments, the indication is transmitted in a signaling, wherein the signaling may be a radio resource control (RRC) signaling, a packet data convergence protocol (PDCP) signaling, a radio link control (RLC) signaling, medium access control (MAC) signaling and/or a L1 signaling.

In some embodiments, the indication is based on an (at least one of) explicit location information, a flight path information or an explicit altitude information. For instance, the UAV UE may itself detect that it lands based on the explicit location information, flight path information or explicit altitude information or the like or this information may be transmitted to the base station (as the indication) and then the base station detects the change from the airborne to the terrestrial mode.

In some embodiments, the indication is an implicit indication.

In some embodiments, the (implicit) indication is based on mobility state information, wherein the mobility state information may include terrestrial user equipment mobility state parameters. In such embodiments, the mobility state information for the airborne mode of the UAV UE may have different parameters than for terrestrial UE, and, thus, by detecting the terrestrial UE mobility state parameters, the base station may detect the change from airborne mode to terrestrial mode.

As also indicated above, the (implicit) indication may be based on a measurement report, wherein the measurement report indicates that it is transmitted from a user equipment being in the terrestrial mode. Thus, the base station can detect the change from the airborne mode to the terrestrial mode based on the measurement report which indicates that it is transmitted from a UE being in the terrestrial mode.

In some embodiments, the (implicit) indication is based on indicating a change from directional antenna to omni-directional antenna. This may be indicated by a change in the UE capability information or L1 measurement reporting (e.g. explicit or implicit by similar PMI (precoding matrix indicator) indication or the like) or by other signaling means.

In some embodiments, the (implicit) indication is based on indicating a deactivation of coordinated multipoint (CoMP).

In some embodiments, the (implicit) indication is based on indicating a change from enhanced coverage level to normal coverage level.

In some embodiment, the (implicit) indication is based on indicating stopping using user equipment fractional path loss compensation factor defined for airborne unmanned aerial vehicles.

In some embodiments, the (implicit) indication is based on indicating stopping using an enhanced P0 value defined for airborne unmanned aerial vehicles.

In some embodiments, as also indicated above, an RRC_connected mode is kept when changing from the airborne mode to the terrestrial mode. Hence, the RRC_Connected mode may be kept after the UAV UE has landed and switched to terrestrial mode.

In some embodiments, a first (airborne) measurement configuration for the airborne mode and a second (terrestrial) measurement configuration of the terrestrial mode are provided to the base station and/or to the UAV UE. Hence, the UAV UE may be configured to have (at least) two measurement configuration (sets), one for the airborne mode and another for the terrestrial mode.

In some embodiments, the unmanned aerial vehicle user equipment is further configured to select the first or second measurement configuration based on location information or altitude information. Thus, depending on whether the UAV UE detects that it is airborne or terrestrial it selects the associated measurement configuration.

In some embodiments, the unmanned aerial vehicle user equipment is further configured to log measurements with the first and second measurement configurations or to log measurements during the airborne mode and terrestrial mode as part of minimization of drive test measurements.

Returning to FIG. 1, a typical embodiment of an NR radio network RAN 1 is illustrated. The RAN 1 has a terrestrial macro cell 2a and an aerial cell 2b, which are each established and served by an eNodeB 3, and a terrestrial NR cell 4a and an aerial NR cell 4b, which are each established and served by an NR eNodeB 5. An (pure) terrestrial UE 6 may be in the terrestrial cells 2a and 4b, respectively, can communicate with the associated NR eNodeB 5 and the eNodeB 3, respectively. Moreover, an UAV UE 7 is provided, which is airborne in FIG. 1 and thus, is in the aerial call 2b. The UAV UE 7 communicates with the eNodeB 3. Moreover, if, for example, the UAV UE 7 travels into the aerial cell 4b, it communicates with the NR eNodeB 5.

Figure 2:
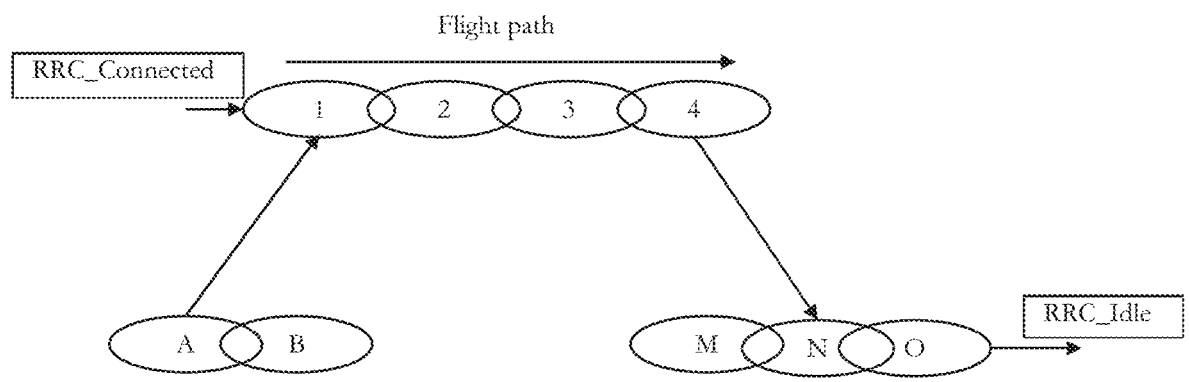
FIG. 2 illustrates a flight path of a UAV UE.

An exemplary travel path of such an UAV UE 7 is illustrated in FIG. 2, which illustrates a couple of terrestrial cells A, . . . , O and a couple of aerial cells 1 to 4.

The UAV UE starts in the terrestrial cell A, where it is a terrestrial UE and is in the terrestrial mode and lifts up, thereby entering the aerial cell 1. The UAV UE is in RRC_Connected mode. While the UAV UE is airborne it flies through cells 1 to 4, wherein the cell 4 is the last cell where it is in the flight path. At some point, the UAV UE informs the network that it becomes a terrestrial UE, i.e. that it changes from airborne mode to terrestrial mode. This information exchange could happen in FIG. 2, when, e.g., either the UAV UE moves from the last aerial cell 4 to the terrestrial cell N or once it is connected via the terrestrial cell N (where it lands), or when the network may provide a different configuration in that last aerial cell 4 of the flight path or when the UAV UE applies a different configuration in the last aerial cell 4 or the terrestrial cell N, where the UAV UE lands. At cell O, the RRC connection is released and the UAV UE goes into RRC_Idle mode.

Figure 3:
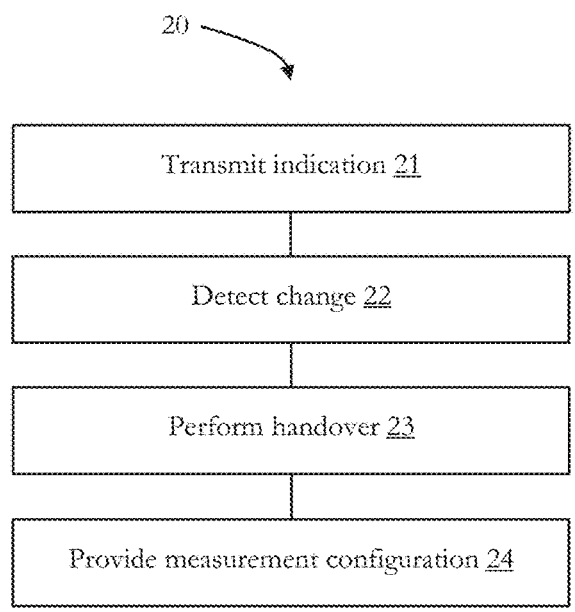
FIG. 3 illustrates a flow chart of an embodiment of a mobile telecommunications method.

In the following, this information exchange will be discussed under reference if FIG. 3, which illustrates a flow chart of a mobile telecommunications method 20, which may be performed by mobile telecommunications system, e.g. of FIG. 1, and the UAV UE (e.g. 7 of FIG. 1) and the base stations, e.g. eNodeB 3 and NR eNodeB 5 of FIG. 1 and the cells as illustrated in FIG. 2 without limiting the present disclosure in that regard.

As also discussed above, at 21 the UAV UE indicates a change from the airborne (UAV) mode to terrestrial UE mode by transmitting an indication to the base station, by means of any one or any combination of the following, wherein at 22 the base station detects the change of the airborne mode to the terrestrial mode based on the indication:

In some embodiments an explicit indication is transmitted at 21. For instance, a new value in an explicit indication is used to indicate the change in UAV airborne status/mode. For example, if the UAV UE indicates "airborne" as one value then "terrestrial" is another value, which may be transmitted as indication. Such a change is informed by a procedure which is initiated by the UAV UE, when the UAV touches the ground or is about to touch the ground (e.g. at cell N in FIG. 2). This indication may be indicated in (at least one of) RRC, PDCP, RLC, MAC or L1 signaling, wherein in some embodiments, the indication is indicated in the RRC signaling. In some embodiments, the intention is to reuse the structure proposed for airborne status indication and to extend it.

As triggers, in some embodiments, explicit location information (which is already proposed to show airborne status) or flight path information are reused.

In other embodiments, an explicit altitude information (which is already proposed to show airborne status) is reused as trigger, e.g. when the UAV touches down or is about to touch down.

In some embodiments, the indication at 21 is based on a mobility state information change, e.g. instead of applying mobility state for UAV operation, terrestrial UE mobility state parameters are applied. If the new mobility state is reported to the network at 21, then it implies that the UAV UE has switched the status form airborne to terrestrial. In this embodiment new mobility state criteria are defined for airborne UAV.

In some embodiments, the UAV UE reports at 21 a measurement report in a format used by a terrestrial UE (e.g. UE 6 in FIG. 1). In this embodiment, a new parameter and/or new "performing measurements" methods are for the airborne UAV UE in the airborne mode, such that the change of the measurement report can be detected by the base station at 21.

In some embodiments, a change from directional antenna to omni-directional antenna is indicated at 21 to the network either by a change in the UE's capability or L1 measurement reporting (which may be performed explicitly or implicitly, e.g. similar to a PMI indication or similar) or other signaling means.

In some embodiments, the change is indicated at 21 by indicating a deactivation of CoMP. If CoMP is configured, a change of the CoMP status can also indicate a change from airborne to terrestrial mode (or vice versa), which can be detected at 22 by the base station.

In some embodiments, the UAV UE indicates a change in its coverage level at 21 from an enhanced coverage level to a normal coverage level, which can be detected as a change of status from airborne to terrestrial at 22.

In some embodiments, an indication to stop using an UAV UE specific fractional path loss compensation factor defined for airborne UAVs is transmitted at 21 which can be detected at 22 as change from airborne to terrestrial mode.

In some embodiments, an indication to stop using enhanced P0 value defined for airborne UAVs is transmitted at 21 which can be detected at 22 as change from airborne to terrestrial mode.

In some embodiments, the network, e.g. base station such as eNodeB, detects a change in measurement results at 22 reported by the UAV UE at 21. For instance, a good neighbor cell is no longer a far away cell but a nearby cell as reported by other terrestrial UEs. However, the network needs to change the measurement configuration for the airborne UE differently than for the terrestrial UE, which may be performed based on the dedicated signaling from network.

In some embodiments, the flight path info to the eNB. For instance, referring to FIG. 2, if the eNB of cell 4 detects that it is the end of the flight path and the UAV UE must handover as a terrestrial UE, then the eNB of cell 4 provides a measurement configuration, e.g. offset favorable for UAV UE to handover, to the eNB of cell N, which is suitable for this UAV UE when it becomes a terrestrial UE. The eNB of cell 4 informs the eNB of cell N during the handover procedure at 23 that the UAV UE is switching from airborne to terrestrial UAV UE. Such UE specific information is necessary in some embodiments, because the same eNB will be playing different roles for different UEs in their flight path. Alternatively, a wrong handover of an airborne UE could occur which the eNB of cell N may reject if UE status is not known.

If flight path info is known to the UAV UE, then the UAV UE may apply a measurement configuration which is favorable for a terrestrial UE (e.g. when it enters cell N). In some embodiments, the UAV UE is configured with both sets of measurement configurations, i.e. for the airborne and for the terrestrial mode. If the flight path information is not present, then the UAV UE may use internal sensors or a combination of both to determine the applicable measurement configuration for selecting the corresponding measurement configuration.

In some embodiments, the eNB normally runs an inactivity timer for a UE and when there is no traffic and the timer expires, then the eNB may initiate an RRC connection release or bearer release procedure. Thus, in some embodiments, in case of a UAV UE getting updates (e.g. at cell N when being in terrestrial mode and the RRC_Connection mode is kept), from the server after the data has been uploaded to the server, the eNB may change the inactivity timer such that it has longer/larger value compared to a "normal" terrestrial UE.

As discussed, the UAV UE may still maintain RRC Connection while still at ground (e.g. Cell N, after landing and after having switched from airborne mode to terrestrial mode), then based on embodiments discussed herein, the UAV UE informs the network (e.g. eNB) about its status as terrestrial UE. The network, e.g. base station, provides a measurement configuration at 24 for a terrestrial UE and switches the mode once UE informs a change of status to airborne.

Figure 4:
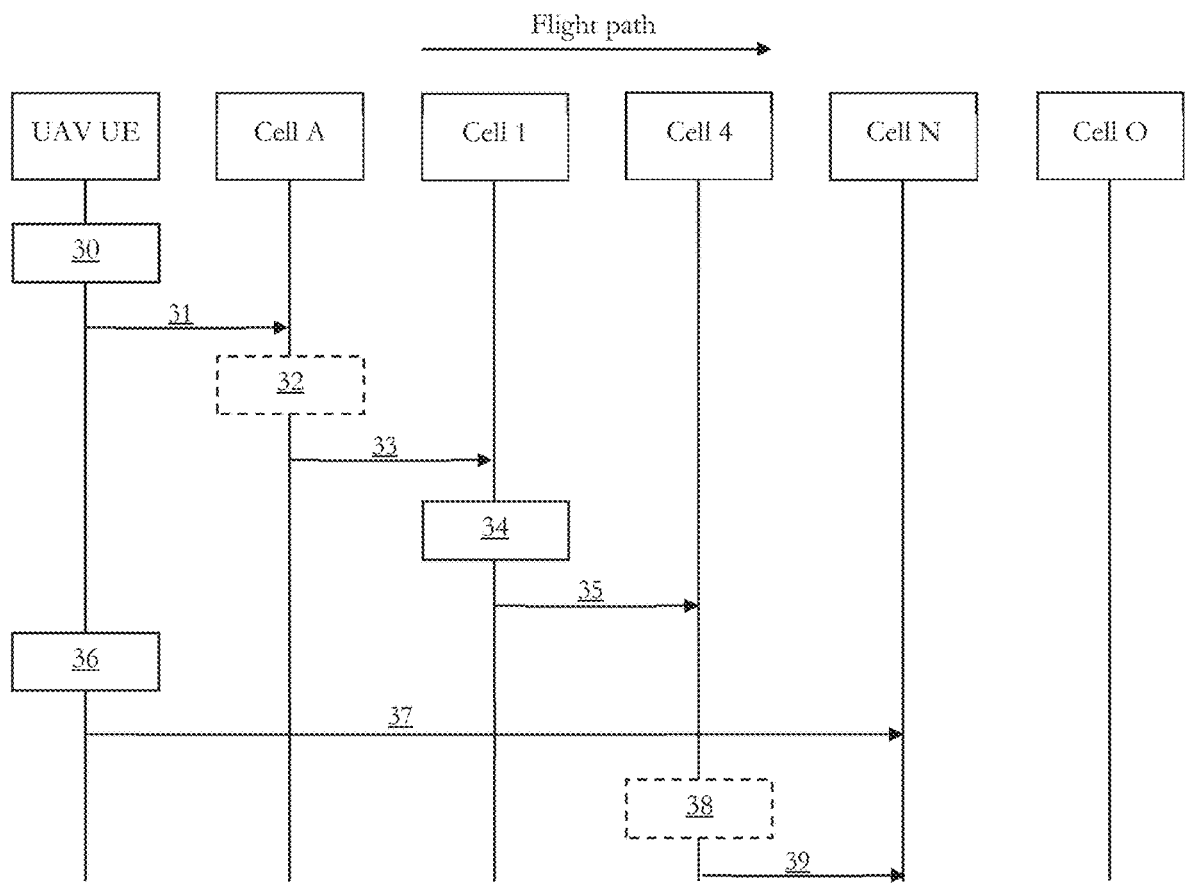
FIG. 4 illustrates an embodiment of mobile telecommunications method including handover procedures.

An overview of an embodiment of the method 20 is illustrated in FIG. 4, which will be discussed in the following.

At 30 the UAV UE is in a (RRC) idle state, while it is in a terrestrial mode and located, for example, in cell A (see also FIG. 2).

At 31, as a first option, the UAV UE which starts flying informs about its airborne status (and, thus, airborne mode) while it is in RRC_Connected mode or during transition to the RRC_Connected mode to cell A.

At 32, as a second option, the network (e.g. base station of cell A) decides the UE status, based on, for example, that the neighbor cell is cell 1, which is an aerial cell, and not cell B, which is a terrestrial cell.

At 33, which is applicable for the first and second option discussed above, the airborne status of the UAV UE is shared with cell 1 during the handover from cell A to cell 1.

At 34, cell 1 (i.e. its serving base station) applies the airborne mobility parameters to the UAV UE. Also the remaining cells 2-4 of the flight path of the UAV UE apply the corresponding airborne mobility parameters the UAV UE.

At 35, the airborne status of the UAV UE is shared with the cells 2-4 of the flight path of the UAV UE during the subsequent handover procedures.

At 36, it is now assumed that the UAV UE intends to land, e.g. in cell N, and, thus, the UAV UE moves down and eventually becomes a terrestrial UE, but it will still be in RRC_Connected mode also after having switched into terrestrial mode (and after having landed).

At 37, according to a first option, the UAV UE informs about its airborne status change, i.e. from airborne mode to terrestrial mode, to cell N while the UAV UE is/keeps RRC_Connected mode.

At 38, according to a second (alternative) option, the network, e.g. eNB, decides/detects the change of the status, i.e. from airborne mode to terrestrial mode, for instance, based on detecting that the neighbor cell is the terrestrial cell N and not, e.g. the next aerial cell 5.

At 39, the UE status change is informed by the eNB of cell 4 to the eNB of cell N in a handover signaling.

Hence, in some embodiments as discussed herein, the issue of the prior art, namely that an indication of airborne status to the network is missing and that it is not considered if UE will continue in RRC_Connected mode while landing is overcome.

Figure 5:
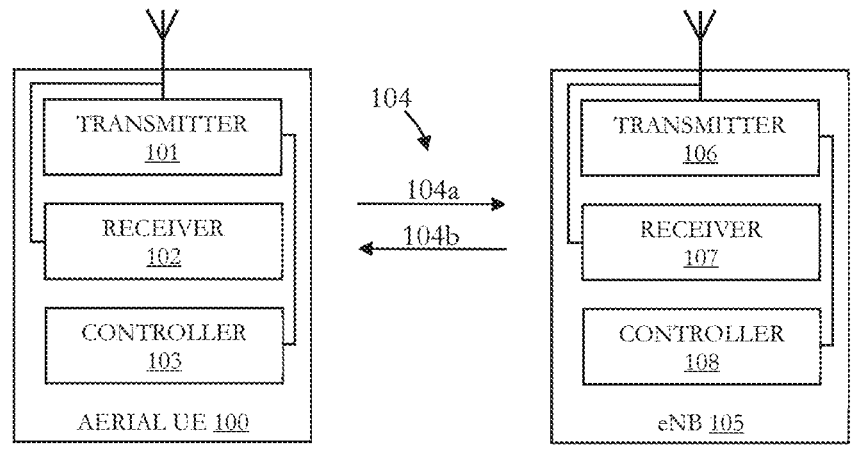
FIG. 5 illustrates an embodiment of UAV UE and a base station.

An embodiment of an aerial UE 100 (UAV UE) and an eNB 105 and a communications path 104 between the aerial UE 100 and the eNB 105 is discussed under reference of FIG. 5.

The aerial UE 100 has a transmitter 101, a receiver 102 and a controller 103, wherein, generally, the technical functionality of the transmitter 101, the receiver 102 and the controller 103 are known to the skilled person, and, thus, a more detailed description of them is omitted.

The eNB 105 has a transmitter 106, a receiver 107 and a controller 108, wherein also here, generally, the functionality of the transmitter 106, the receiver 107 and the controller 108 are known to the skilled person, and, thus, a more detailed description of them is omitted.

The communication path 104 has an uplink path 104a, which is from the aerial UE 100 to the eNB 105, and a downlink path 104b, which is from the eNB 105 to the aerial UE 100.

During operation, the controller 103 of the aerial UE 100 controls the reception of downlink signals over the downlink path 104b at the receiver 102 and the controller 103 controls the transmission of uplink signals over the uplink path 104a via the transmitter 101.

Similarly, during operation, the controller 108 of the eNB 105 controls the transmission of downlink signals over the downlink path 104b over the transmitter 107 and the controller 108 controls the reception of uplink signals over the uplink path 104a at the receiver 106.

Figure 6:
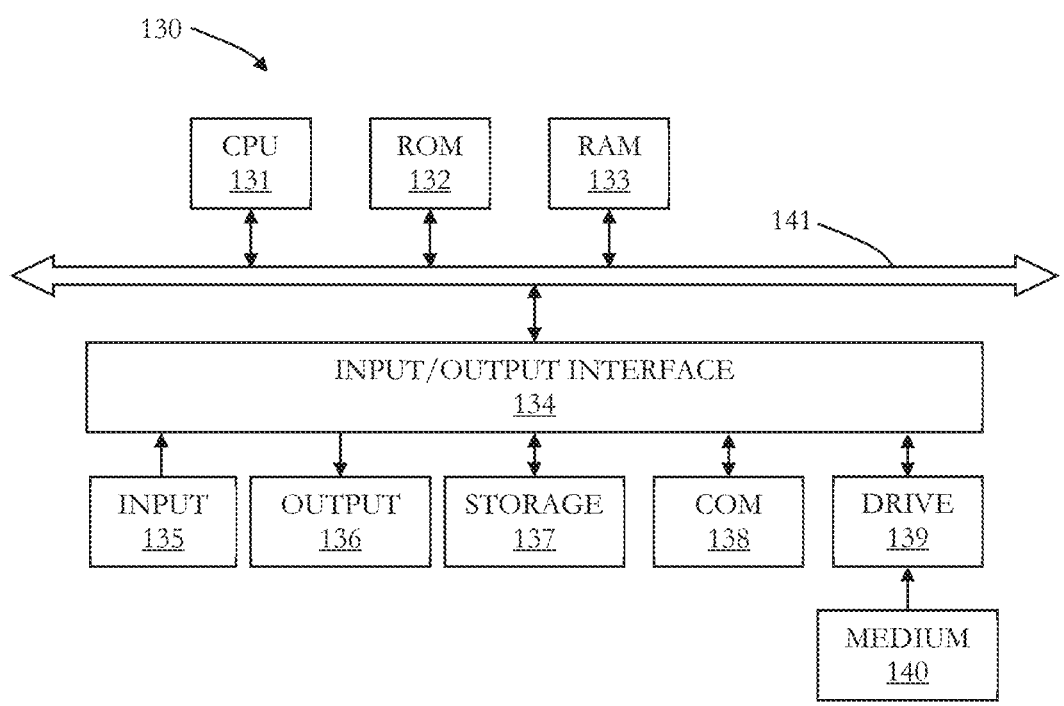
FIG. 6 illustrates an embodiment of a multi-purpose computer which can be used for implementing a base station and a user equipment.

In the following, an embodiment of a general purpose computer 130 is described under reference of FIG. 6. The computer 130 can be implemented such that it can basically function as any type of base station or new radio base station, transmission and reception point, or (aerial) user equipment as described herein. Moreover, the computer 130 may be used for implementing a controller of a (aerial) UE or of a (new radio) base station or any other network entity as described herein.

The computer has components 131 to 140, which can form a circuitry, such as any one of the circuitries of the (new radio) base stations, and (aerial) user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is nor limited to any particularities of such protocols.

The methods as described herein are also implemented in some embodiments as a computer program causing a computer and/or a processor and/or circuitry to perform the method, when being carried out on the computer and/or processor and/or circuitry. In some embodiments, also a non-transitory computer-readable recording medium is provided that stores therein a computer program product, which, when executed by a processor and/or circuitry, such as the processor and/or circuitry described above, causes the methods described herein to be performed.

It should be recognized that the embodiments describe methods with an exemplary order of method steps. The specific order of method steps is, however, given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A user equipment for an unmanned aerial vehicle for a mobile telecommunications system including circuitry configured to communicate with at least one base station, wherein the circuitry is further configured to:
transmit an indication of a change from an airborne mode to a terrestrial mode.

(2) The user equipment for an unmanned aerial vehicle of (1), wherein the indication is an explicit indication.

(3) The user equipment for an unmanned aerial vehicle of (2), wherein the indication is transmitted in a signaling.

(4) The user equipment for an unmanned aerial vehicle of (3), wherein the signaling is a radio resource control signaling, a packet data convergence protocol signaling, a radio link control signaling, medium access control signaling or a L1 signaling.

(5) The user equipment for an unmanned aerial vehicle of anyone of (2) to (4), wherein the indication is based on an explicit location information, a flight path information or an explicit altitude information.

(6) The user equipment for an unmanned aerial vehicle of anyone of (1) to (5), wherein the indication is an implicit indication.

(7) The user equipment for an unmanned aerial vehicle of (6), wherein the indication is based on mobility state information.

(8) The user equipment for an unmanned aerial vehicle of (7), wherein the mobility state information includes terrestrial user equipment mobility state parameters.

(9) The user equipment for an unmanned aerial vehicle of anyone of (6) to (8), wherein the indication is based on a measurement report.

(10) The user equipment for an unmanned aerial vehicle of (9), wherein the measurement report indicates that it is transmitted from a user equipment being in the terrestrial mode.

(11) The user equipment for an unmanned aerial vehicle of anyone of (6) to (10), wherein the indication is based on indicating a change from directional antenna to omni-directional antenna.

(12) The user equipment for an unmanned aerial vehicle of anyone of (6) to (11), wherein the indication is based on indicating a deactivation of coordinated multipoint.

(13) The user equipment for an unmanned aerial vehicle of anyone of (6) to (12), wherein the indication is based on indicating a change from enhanced coverage level to normal coverage level.

(14) The user equipment for an unmanned aerial vehicle of anyone of (6) to (13), wherein the indication is based on indicating stopping using user equipment fractional path loss compensation factor defined for airborne unmanned aerial vehicles.

(15) The user equipment for an unmanned aerial vehicle of anyone of (6) to (14), wherein the indication is based on indicating stopping using an enhanced P0 value defined for airborne unmanned aerial vehicles.

(16) The user equipment for an unmanned aerial vehicle of anyone of (1) to (15), wherein an RRC connected mode is kept when changing from the airborne mode to the terrestrial mode.

(17) The user equipment for an unmanned aerial vehicle of anyone of (1) to (16), wherein a first measurement configuration for the airborne mode and a second measurement configuration of the terrestrial mode are provided.

(18) The user equipment for an unmanned aerial vehicle of (17), wherein the circuitry is further configured to select the first or second measurement configuration based on location information or altitude information.

(19) The user equipment for an unmanned aerial vehicle of (17) or (18), wherein the circuitry is further configured to log measurements with the first and second measurement configurations or to log measurements during the airborne mode and terrestrial mode as part of minimization of drive test measurements.

(20) A mobile telecommunications system including at least one base station configured to communicate with at least one user equipment for an unmanned aerial vehicle, wherein
the user equipment for an unmanned aerial vehicle includes a circuitry configured to transmit an indication of a change from an airborne mode to a terrestrial mode; and
the base station includes a circuitry configured to detect a change from the airborne mode to the terrestrial mode, based on the indication received from the user equipment.

(21) The mobile telecommunications system of (20), wherein the indication transmitted from the user equipment is based on a measurement result report and wherein the base station is further configured to detect the change based on the measurement result report.

(22) The mobile telecommunications system of (20) or (21), wherein the flight path of the user equipment for an unmanned aerial vehicle is known and wherein the base station at the end of the flight path is further configured to provide a measurement configuration for handover to another base station.

(23) The mobile telecommunications system of (22), wherein the base station at the end of the flight path is further configured to inform the other base station, during a handover procedure, that the user equipment for an unmanned aerial vehicle switches from the airborne mode to the terrestrial mode.

(24) The mobile telecommunications system of anyone of (20) to (23), wherein the base station is further configured to set an inactivity timer for releasing an RRC connection of the user equipment for an unmanned aerial vehicle changing from airborne mode to terrestrial mode.

(25) The mobile telecommunications system of (24), wherein the inactivity timer has a larger value than a value of an inactivity timer set for a terrestrial user equipment.

(26) The mobile telecommunications system of anyone of (20) to (25), wherein base station is further configured to configure a measurement configuration based on the indication.

(27) The mobile telecommunications system of anyone of (20) to (26), wherein the indication is an explicit indication.

(28) The mobile telecommunications system of anyone of (20) to (27), wherein the indication is transmitted in a signaling.

(29) The mobile telecommunications system of (28), wherein the signaling is a radio resource control signaling, a packet data convergence protocol signaling, a radio link control signaling, medium access control signaling or a L1 signaling.

(30) The mobile telecommunications system of (27) or (28), wherein the indication is based on an explicit location information, a flight path information or an explicit altitude information.

(31) The mobile telecommunications system of anyone of (20) to (30), wherein the indication is an implicit indication.

(32) The mobile telecommunications system of (31), wherein the indication is based on mobility state information.

(33) The mobile telecommunications system of (32), wherein the mobility state information includes terrestrial user equipment mobility stare parameters.

(34) The mobile telecommunications system of anyone of (31) to (33), wherein the indication is based on a measurement report.

(35) The mobile telecommunications system of (34), wherein the measurement report indicates that it is transmitted from a user equipment being in the terrestrial mode.

(36) The mobile telecommunications system of anyone of (31) to (35), wherein the indication is based on indicating a change from directional antenna to omni-directional antenna.

(37) The mobile telecommunications system of anyone of (31) to (36), wherein the indication is based on indicating a deactivation of coordinated multipoint.

(38) The mobile telecommunications system of anyone of (31) to (37), wherein the indication is based on indicating a change from enhanced coverage level to normal coverage level.

(39) The mobile telecommunications system of anyone of (31) to (38), wherein the indication is based on indicating stopping using user equipment fractional path loss compensation factor defined for airborne unmanned aerial vehicles.

(40) The mobile telecommunications system of anyone (31) to (39), wherein the indication is based on indicating stopping using an enhanced P0 value defined for airborne unmanned aerial vehicles.

(41) The mobile telecommunications system of anyone of (20) to (40), wherein an RRC connected mode is kept when changing from the airborne mode to the terrestrial mode.

(42) The mobile telecommunications system of anyone of (20) to (41), wherein a first measurement configuration for the airborne mode and a second measurement configuration of the terrestrial mode are provided.

(43) The mobile telecommunications system of (42), wherein the user equipment for an unmanned aerial vehicle is further configured to select the first or second measurement configuration based on location information or altitude information.

(44) The mobile telecommunications system of (42) or (43), wherein the user equipment for an unmanned aerial vehicle is further configured to log measurements with the first and second measurement configurations or to log measurements during the airborne mode and terrestrial mode as part of minimization of drive test measurements.

(45) The mobile telecommunications system of anyone of (20) to (44), wherein the base station is configured to inform another base station, during a handover procedure, about the mode of the user equipment for an unmanned aerial vehicle.

The invention claimed is:

1. A base station configured to communicate with at least one user equipment for an unmanned aerial vehicle, the base station comprising:
    circuitry configured to
        detect a change in an altitude of the unmanned aerial vehicle corresponding to the unmanned aerial vehicle landing, based on an indication received from the user equipment, and
        set a first timer for releasing an RRC connection of the unmanned aerial vehicle after the unmanned aerial vehicle lands, the first timer for the unmanned aerial vehicle having a larger value than a value of a second timer set for a terrestrial user equipment.

2. The base station of claim 1, wherein the indication transmitted from the user equipment is based on a measurement result report and wherein the base station is further configured to detect the change based on the measurement result report.

3. The base station of claim 1, wherein a flight path of the user equipment for an unmanned aerial vehicle is known and wherein the base station at the end of the flight path is further configured to provide a measurement configuration for handover to another base station.

4. The base station of claim 3, wherein the base station at the end of the flight path is further configured to inform the other base station, during a handover procedure, that the user equipment for an unmanned aerial vehicle switches from flying to a terrestrial mode.

5. The base station of claim 1, wherein base station is further configured to configure a measurement configuration based on the indication.

6. The base station of claim 1, wherein the indication is an explicit indication.

7. The base station of claim 6, wherein the indication is based on an explicit location information, a flight path information or an explicit altitude information.

8. The base station of claim 1, wherein the indication is transmitted in a signaling.

9. The base station of claim 8, wherein the signaling is a radio resource control signaling, a packet data convergence protocol signaling, a radio link control signaling, medium access control signaling or a LI signaling.

10. The base station of claim 1, wherein the indication is an implicit indication.

11. The base station of claim 10, wherein the indication is based on mobility state information.

12. The base station of claim 11, wherein the mobility state information includes terrestrial user equipment mobility state parameters.

13. The base station of claim 10, wherein the indication is based on a measurement report.

14. The base station of claim 13, wherein the measurement report indicates that it is transmitted from a user equipment being in a terrestrial mode.

15. The base station of claim 10, wherein the indication is based on indicating a change from directional antenna to omni-directional antenna.

16. The base station of claim 10, wherein the indication is based on indicating a deactivation of coordinated multipoint.

17. The base station of claim 10, wherein the indication is based on indicating a change from enhanced coverage level to normal coverage level.

18. The base station of claim 10, wherein the indication is based on indicating stopping using user equipment fractional path loss compensation factor defined for airborne unmanned aerial vehicles.

19. A method of operating a base station to communicate with at least one user equipment for an unmanned aerial vehicle, the method comprising:
    detecting a change in an altitude of the unmanned aerial vehicle corresponding to the unmanned aerial vehicle landing, based on an indication received from the user equipment; and
    setting a first timer for releasing an RRC connection of the unmanned aerial vehicle after the unmanned aerial vehicle lands, the first timer for the unmanned aerial vehicle having a larger value than a value of a second timer set for a terrestrial user equipment.

* * * * *